(No Model.)
B. CLAYTON.
SPRING.
No. 301,963. Patented July 15, 1884.
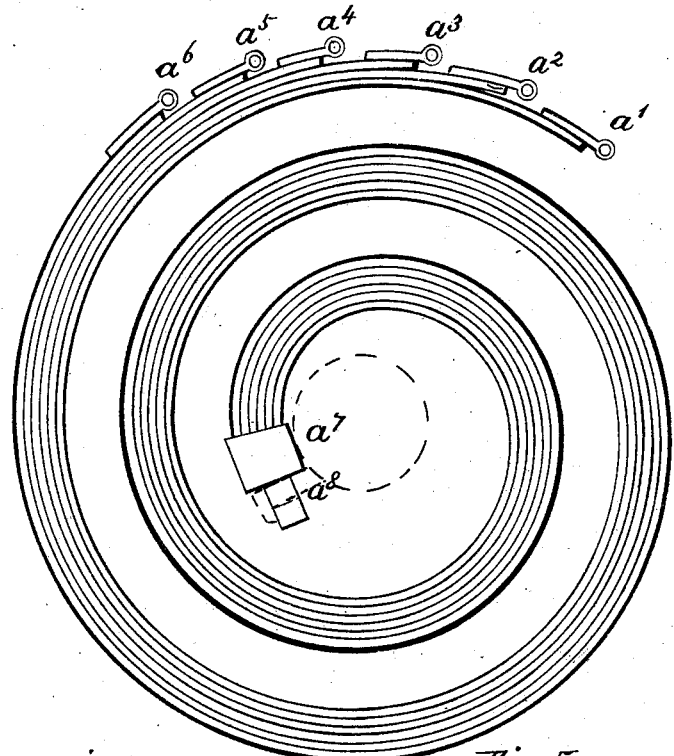
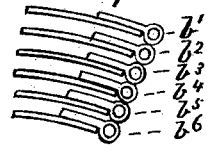
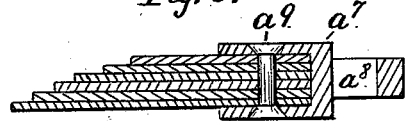
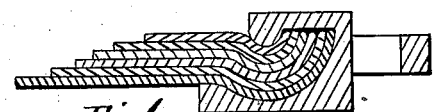
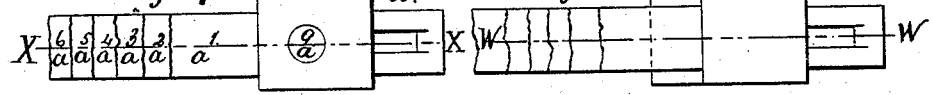
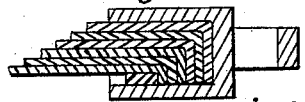
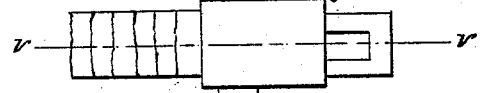
Witnesses.
H. C. Pole
H. Daniels
Inventor.
Barnes Clayton
by his Attorney
B. C. Pole.

UNITED STATES PATENT OFFICE.

BARNES CLAYTON, OF PHILADELPHIA, PENNSYLVANIA.

SPRING.

SPECIFICATION forming part of Letters Patent No. 301,963, dated July 15, 1884.

Application filed December 7, 1883. (No model.)

*To all whom it may concern:*

Be it known that I, BARNES CLAYTON, a citizen of the United States, residing at Philadelphia, in the county of Philadelphia and State of Pennsylvania, have invented certain new and useful Improvements in Springs, of which the following is a specification, reference being had therein to the accompanying drawings.

The object of this invention relates to coiled springs, and the nature thereof is in providing re-enforcement springs—one within another—in a mechanical and merchantable manner, being a new article of manufacture.

By reference to the drawings and letters of reference marked thereon it will be seen that Figure 1 is a side elevation of my improved spring. Fig. 2 shows a modified arrangement of the ends of the spring. Fig. 3 is a section on line $x\,x$ of Fig. 4, and is the end of the spring where it is attached to the winding-shaft, shown in dotted lines in Fig. 1. Fig. 4 is the plan of the end of the large spring, Fig. 1. Fig. 5 is a section on the line $w\,w$ of Fig. 6. Fig. 6 is a plan of a modified construction for securing the ends of the spring A. Fig. 7 is a cross-section on line $v\,v$ of Fig. 8. Fig. 8 is a plan of still another modification for securing the inner end of the large spring A.

In all, the same letters refer to the same parts.

To enable those skilled in the art to make and use my invention, I will proceed to describe its construction and operation.

The spring A, Fig. 1, is composed of six parts, $a'\,a^2\,a^3\,a^4\,a^5\,a^6$, and each of these parts is simple coiled springs, one within another. They are joined together by the shank $a^7$ at the inner end, and held in this shank $a^7$ by a rivet, $a^9$, as is clearly shown by the sectional Fig. 3. The shank $a^7$ is also provided with an eyelet, $a^8$. This shank $a^7$ may be of suitable tapering and elongated construction, and may be curved inward toward the winding-shaft, if desired. The outer ends of the six springs terminate in eyelets or hooks. These can be arranged either as shown by Fig. 1, or as in Fig. 2, or as may be desired.

Figs. 5, 6, 7, and 8 are equivalent constructions for securing the inner end of the spring A. The spring A may comprise any desired number of re-enforcement springs.

The operation of my invention will be as follows: In winding, the springs $a'\,a^2\,a^3\,a^4\,a^5\,a^6$ will have a positive movement one upon another, causing the successive springs to be very effective in giving out the power which has been imparted to them in winding, and at the same time, by the above set forth movements, prevent the straining of the metal, as in the instance of thick and heavy springs where they are bent down into sharp curves.

Having thus described the construction and operation of my invention, what I claim, and desire to secure by Letters Patent of the United States, is as follows:

The combination re-enforcement coil-spring A $a'\,a^2\,a^3\,a^4\,a^5\,a^6$, shank $a^7$, and eyelet $a^8$, combined and constructed as and for the purposes specified.

In testimony whereof I affix my signature in presence of two witnesses.

BARNES CLAYTON.

Witnesses:
 HERMAN KOECHER,
 WM. M. MCKNIGHT.